United States Patent [19]
Lilja et al.

[11] Patent Number: 5,547,322
[45] Date of Patent: Aug. 20, 1996

[54] FASTENING MEMBER FOR FASTENING AN OBJECT SUCH AS A NET, A STEEL WIRE, CABLE OR THE LIKE TO A CARRIER SUCH AS A POST

[76] Inventors: Lars Lilja, Folkungagatan 3, Varnamo S-331 41, Sweden; Ulf Enroth, Folkungagatan 5, Varnamo S-331 41, Sweden

[21] Appl. No.: 313,037
[22] PCT Filed: Feb. 19, 1993
[86] PCT No.: PCT/SE93/00129
§ 371 Date: Sep. 26, 1994
§ 102(e) Date: Sep. 26, 1994
[87] PCT Pub. No.: WO93/20313
PCT Pub. Date: Oct. 14, 1993

[30] Foreign Application Priority Data
Mar. 27, 1992 [SE] Sweden .................................. 9200949

[51] Int. Cl.⁶ .......................... F16B 13/06; F16B 19/00; F16L 3/00
[52] U.S. Cl. ............................. 411/60; 411/41; 411/509; 248/73
[58] Field of Search ................... 411/41, 57, 60, 411/508–510, 913; 24/453, 458; 248/73

[56] References Cited

U.S. PATENT DOCUMENTS

| | | |
|---|---|---|
| 1,925,488 | 9/1933 | Kern . |
| 3,345,706 | 10/1967 | Stokes ................................. 24/458 X |
| 4,180,247 | 12/1979 | Pfarr . |
| 4,356,987 | 11/1982 | Schmid ............................... 24/458 X |
| 4,379,536 | 4/1983 | Mizuno et al. ....................... 248/73 |
| 4,405,272 | 9/1983 | Wollar ................................. 411/41 |
| 4,525,904 | 7/1985 | Petrl ................................. 411/508 X |
| 5,149,027 | 9/1992 | Weber ............................... 248/73 X |

FOREIGN PATENT DOCUMENTS

| | | |
|---|---|---|
| 308372 | 7/1973 | Austria . |
| 0062690 | 7/1985 | European Pat. Off. . |
| 3706149 | 9/1988 | Germany . |

*Primary Examiner*—Neill R. Wilson
*Attorney, Agent, or Firm*—Weiner, Carrier & Burt, P.C.; Joseph P. Carrier; Irving M. Weiner

[57] ABSTRACT

A fastening member for fastening a net to a tubular post has, on the one hand, a holder portion (2) for fixedly retaining the net and, on the other hand, an anchorage portion (1) for fixedly retaining the fastening member in the post. The anchorage portion (1) extends in through a hole in the wall of the post and is provided with barbs (7,9) which snap in place in the fastening member. The anchorage portion (1) has a longitudinal passage (4) in communication with an accommodation space (3) in the holder portion (2). The passage (4) has a funnel-shaped flared mouth portion (5) to facilitate insertion of a wire included in the net in the accommodation space (3). On insertion of the wire, the passage (4) is flared in that the wall (12,13) of the holder portion (2) facing away from the passage (4) is resiliently bendable.

19 Claims, 2 Drawing Sheets

5,547,322

FASTENING MEMBER FOR FASTENING AN OBJECT SUCH AS A NET, A STEEL WIRE, CABLE OR THE LIKE TO A CARRIER SUCH AS A POST

FIELD OF THE INVENTION

The present invention relates to a fastening member for fastening an object such as a net, a steel wire, cable or the like to a carrier such as a post, a wall or the like, comprising a holder portion for fixedly retaining the object, and an anchorage portion for insertion in an opening in the carrier, the anchorage portion having barb members which are disposed, for securing the fastening member to the carrier, to snap into engagement with the carrier on insertion of the anchorage portion in the opening.

DESCRIPTION OF THE BACKGROUND ART

On erecting fences along traffic arteries to prevent game from getting on to the traffic artery, two methods are employed today for securing the fence. As one alternative, use is made of sheet metal lugs which extend about wires or cables included in the fence and which, via blind rivets, are secured in holes in those posts which support the fence. As another alternative, solutions are also proposed in the art in which the post supporting the fence is provided with welded projecting hooks on which the fence is suspended, whereafter the hooks are bent so as to form a closed ring which fixedly retains the fence.

These prior an designs and constructions may function satisfactorily of themselves, but are expensive to manufacture and use.

Fastening members of the type mentioned by way of introduction are also known within other technical fields, for example for fixedly securing different small fittings in the automotive industry or the like. However, these constructions cannot be employed for fastening the above-considered fences, on the one hand purely for reasons of mechanical strength, and on the other hand on the grounds that interconnection of a steel wire cable or the like included in the fence with the fastening member is not feasible.

SUMMARY OF THE INVENTION

The present invention has for its object to devise a fastening member of the type mentioned by way of introduction, the fastening member being designed in such a manner that it is readily suited for fastening objects, for example fences, to carriers, for example tubular posts, in such a way that the degree of mechanical strength will be satisfactory, that the erection operation may take place simply and conveniently and that there are no stringent demands placed on accurate tolerances in the components employed.

The present invention further has for its object to realise a fastening member which substantially cheapens erection work in comparison with the prior an technologies.

The objects forming the basis of the present invention will be attained if the fastening member intimated by way of introduction is characterized in that the anchorage portion has a longitudinal passage in communication with an accommodation space in the holder portion; and that the passage has a flared mouth portion at its end turned to face away from the accommodation space.

These characterizing features make for a highly simple assembly operation in that the fastening member is quite simply forced over a cable or steel wire include in the fence, and that thereafter the fastening member is forced into the opening in the carrier.

In one preferred embodiment, it suitably also applies according to the present invention that the accommodation space is of considerably greater extent transversely of the longitudinal direction of the passage than therealong.

These characterizing features allow for considerable flexibility when it comes to the possibilities of compensating for detective tolerances.

Further advantages will be attained according to the present invention if the subject matter hereof is also given one or more of the characterizing features as set forth in appended claims 3 to 9.

BRIEF DESCRIPTION OF THE ACCOMPANYING DRAWING

The present invention will now be described in greater detail hereinbelow, with particular reference to the accompanying Drawing. In the accompanying Drawing.

DESCRIPTION OF THE PREFERRED EMBODIMENT

Figure 1:
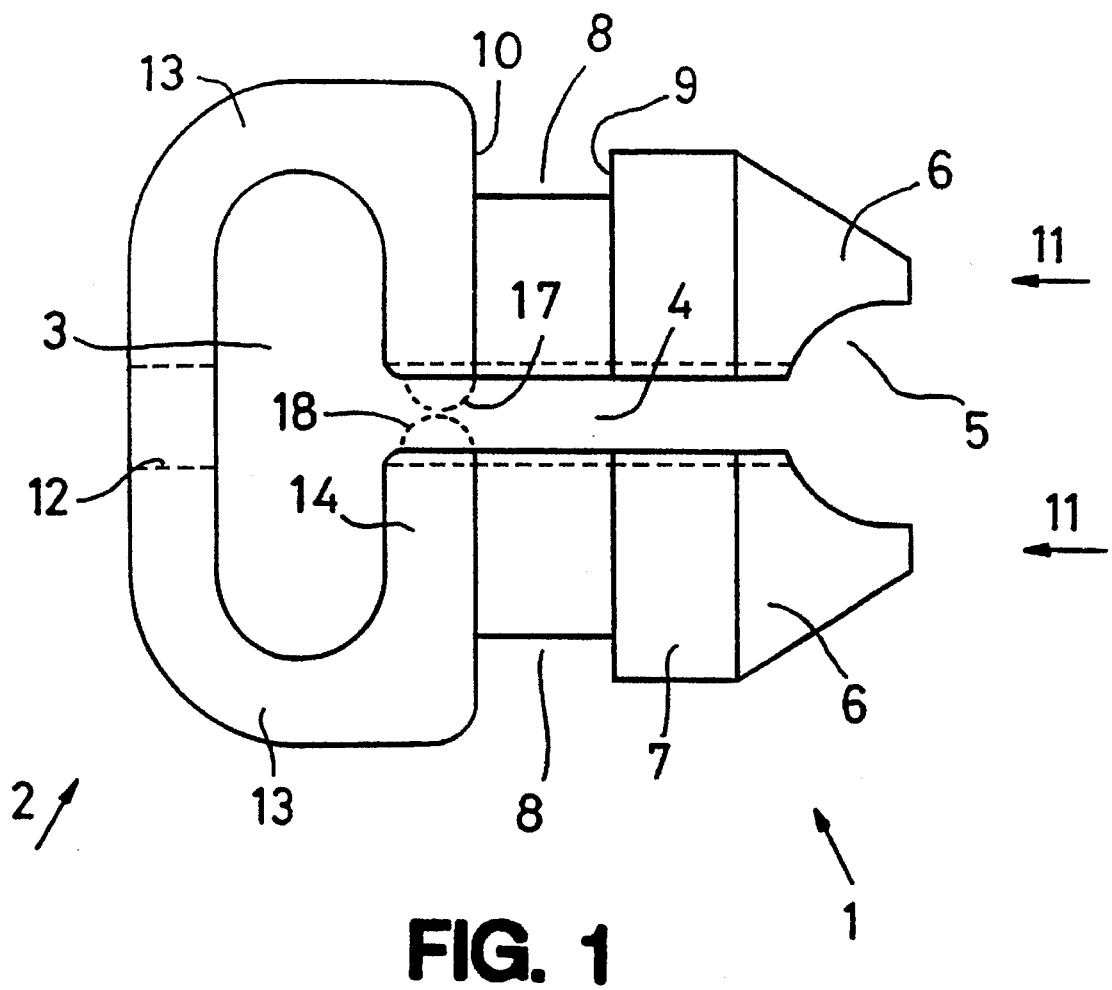
FIG. 1 is a side elevation, seen in the horizontal direction, of the fastening member, as this is oriented on use.
Figure 3:
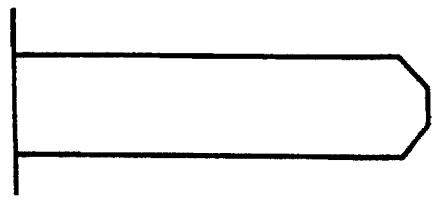
FIG. 3 is a side view of a locking pin.

It will be apparent from the Figures that the fastening member includes an anchorage portion I which is intended to be inserted in an opening in a carrier such as a tubular post, a post of profiled material or the like, in order, in connection with or after insertion, to snap into engagement with the carrier so that the fastening member is reliably held in place thereon. The fastening member further includes a holder portion which is intended to cooperate with that object which is to be secured for fixedly retaining the object. To this end, the holder portion 2 has an accommodation space 3 for accommodating that object which the fastening member is to retain.

The accommodation space 3 is in communication with one end of a passage 4 which extends in the longitudinal direction of the anchorage portion 1 and which opens at the opposite end thereof facing away from the holder portion 2. The passage is slit-shaped with its thickness directed vertically and width horizontally in the position of use of the fastening member according to the invention. Furthermore, the passage 4 has, at its opposite end facing away from the holder portion 2, a funnel-shaped flared mouth portion 5 for facilitating or making at all possible insertion of the object into the accommodation space 3 via the passage 4. In the embodiment illustrated in FIG. 1, the mouth portion 5 is of approximately semi-cylindrical contour, to which the slit-shaped passage connects.

Naturally, the mouth portion 5 may also be wedge-shaped or have other suitable configuration tapering from the outside and inwardly towards the passage 4.

The anchorage portion I is designed so as to cooperate with a preferably circular bore in the carrier, which may consist of a tube. Furthermore, the anchorage portion 1 has, in its end lacing away from the holder portion 2, a tapering end portion 6 which is intended to facilitate insertion of the anchorage portion into the opening in the carrier. In association with the inner end of this end portion, there is an approximately uniformly thick portion 7, which can have an outer contour approximately like a cylinder. Inside this uniformly thick portion 7, there is a recess or transverse, preferably circumferential, groove 8 so that the anchorage portion will there have a neck for accommodating or engaging an edge portion in the material of the carrier about the opening in the carrier. This recess is, in a direction towards the end of the anchorage portion, defined by a shoulder 9 or a generally transversely directed surface. In the opposite direction, the recess is defined by the holder portion 2 or an opposing, transversely directed surface 10 on the anchorage portion.

As a result of the above-described design and construction of the anchorage portion 1, this will function as a snap-in fastening device for snapping in the opening in the carrier. In such instance, on insertion of the fastening member according to the present invention in the opening of the carrier, the passage 4 will first be pressed together against a prestressing in the material of the fastening member according to the invention, when the end portion 6 enters the opening of the carrier. Thereafter, the passage 4 will once again be flared expanded when the wall of the carrier is located in the region of the recess 8, so that thereby the anchorage portion snaps into positionally fixing engagement with the carrier. The anchorage portion 1 has hereby been provided with barb members which can snap into the carrier for fixedly retaining the fastening member according to the invention.

The two shanks 11 into which the anchorage portion 1 is divided by the passage 4 are to be considered as substantially rigid, while those deformations which were described above partly on insertion of the object in the accommodating space 3 and partly on insertion of the anchorage portion 1 in the opening in the carrier, and fixedly snapping of the anchorage portion in place are brought about by resilient deformation of the holding portion 2, in particular its defining wall 12 facing away from the anchorage portion 1 and also the transition region 13 of this wall to the wall 14 of the holder portion connected to the shanks 11. As a result of the above-described design of the holder portion 2, there will be achieved a relatively large wall length over which requisite deformation can be distributed, so that thereby the shanks 11 can, to a considerable degree, be bent away from one another without material stresses being so great that permanent deformations occur or that the resilient capacity is lost, or possibly that fracture occurs.

The importance of the above disclosures can be exemplified by dimensions which occur quite commonly in practice, and in which the height or thickness of the passage 4 may lie in the order of magnitude of between 1 and 1.5 mm, while the diameter of the mouth portion 5 may be of the order of magnitude of between 4 and 5 mm. Approximately the same diameter of that part which is to be inserted in the accommodation space 3 may also come into question, for which reason the passage 4 must, by resilient bending of the holder portion 2, be able to be flared approximately to three or four times its height without the material breaking or the snap-in effect on insertion of the anchorage portion being lost.

It will further be apparent from FIG. 1 that the accommodation space 3 is of considerably greater extent in the vertical direction (with the fastening member of the present invention oriented in the position of use) than in the width direction relative to a longitudinal axis of the passage 4 as shown, the extent between the transition regions 13 is much greater than. Hereby, the object inserted in the accommodation space 3 may be free to move in the vertical direction within the available space, for which reason requirements on precision and tolerances in both the fence employed and the bores of the carrier can be kept down. The considerable extent in the vertical direction of the accommodation space 3 further permits that the object which is accommodated in the accommodation space can slope quite substantially in relation to a vertical line, even if the fastening member of the present invention were to be disposed in a vertically upstanding post and be aligned in relation thereto.

Figure 2:
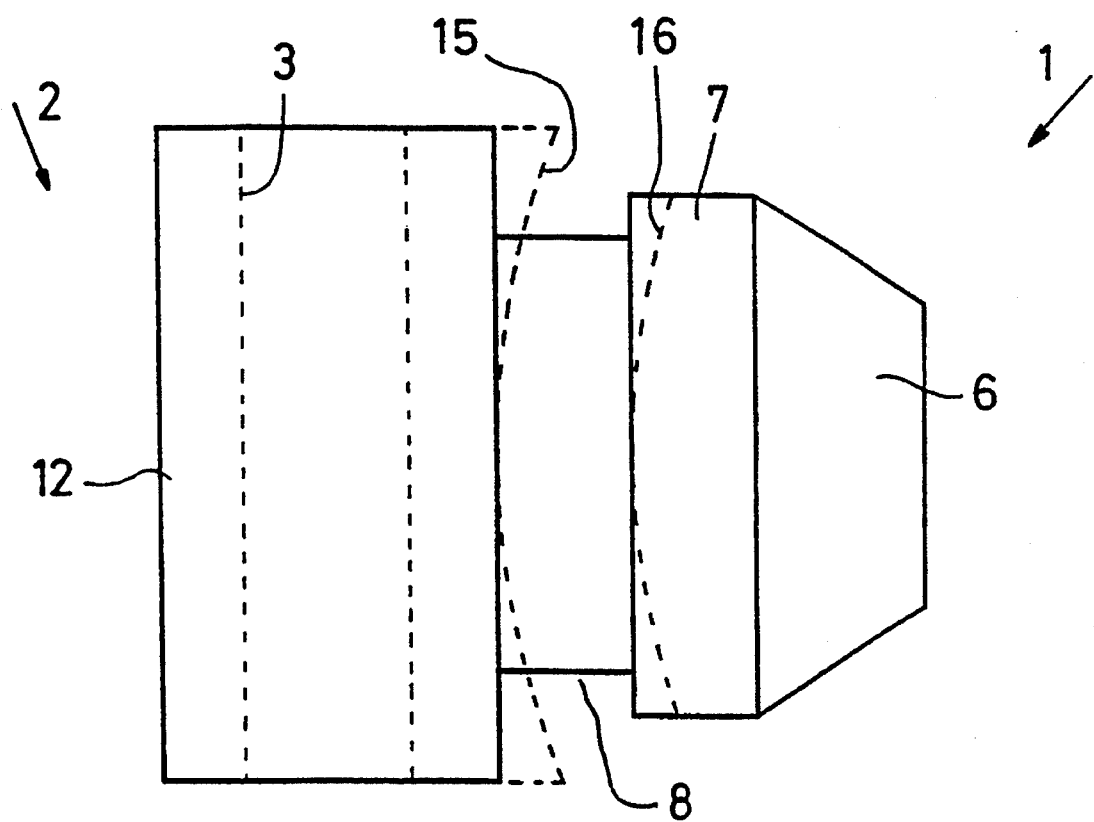
FIG. 2 is a plan view of the fastening member, as this is oriented on use.

It will be apparent from FIGS. 1 and 2 that the extent in the horizontal direction of the holder portion 2 is approximately the same as its vertical extent. Seen in an end view (from the left in FIG. 2), the holder portion would, therefore, be largely square in appearance.

DESCRIPTION OF ALTERNATIVE EMBODIMENTS

According to the present invention, the anchorage portion 1 has been described as being provided with a single, approximately slit-shaped passage 4 which is in communication with the accommodation space 3. According to the invention however, it is possible to arrange a further passage approximately at right angles to the above-mentioned passage 4. Hereby, the anchorage portion 1 will be divided into four mutually discrete shanks instead of the above-disclosed 22 shanks 11.

On the Drawing and in the foregoing description, the recess or groove 8 has been described as circumferential and approximately uniformly deep (same radial depth) throughout the entire turn. This is not necessary, given that the shanks 11 only move towards and away from one another on mounting of the fastening member of the present invention in tile carrier. Thus, no contraction in the width direction of the passage 4 takes place in the preferred embodiment. For this reason, it is sufficient if the groove or recess 8 has full depth on the upper and lower side of the anchorage portion 1. The depth of the recess where it meets the passage 4 can, therefore, be less—or even nought.

Furthermore, the recess 8 has been shown on the Drawing as an annular, approximately circular groove in the anchorage portion. Such a groove is designed in correspondence with that which would be required for extremely good fit and abutment against the front or outside of the carrier or its rear or inside, respectively, on fastening of the anchorage portion in a carrier with a planar anchorage surface, such as a planar sheet or profile. Preferably however, the anchorage portion is secured in a tubular post, for which reason the axial defining surfaces of the groove 8 would not be substantially annular and planar but rather be designed as pans of cylindrical surfaces, approximately in the manner as intimated by the broken lines 15 and 16 in FIG. 2. With such a design, the subject matter of the present invention would also be prevented from rotating about its centre axis in the bore in which it is inserted and fixedly snapped in place in the carrier.

If, in special situations, the deformation capacity of the holder portion 2 were not to prove sufficient to ensure a reliable mounting of the present invention, it is possible to provide the holder portion with channel-shaped inward bulges, running at right angles to the plane of the Drawing, in the walls 12 or 13 so that thereby attenuated material portions are formed which provide an increased deformation capacity.

In order to increase that tension force which the shanks 11 exercise against the carrier on fixed snapping of the anchorage portion 1 in place, the shanks can, on manufacture, be given a divergence of the order of between 0° and 15°, preferably approximately 10°, with increased height in the passage 4 in a direction away from the holder portion 2. Such a wedge-shaped passage 4 can also wholly or partly replace the mouth portion 5, or otherwise expressed, the mouth portion may extend substantially right in up to the accommodation space 3. Such a divergence of the shanks 11 is also advantageous as regards compensating for such unintentional deformations or shrinkages as may occur on manufacture of the fastening member of the present invention.

In order further to reinforce the tension force of the shanks 11 on snapping into place of the anchorage portion, it is possible to provide the inner end portions of the upper and lower defining surfaces of the passage 4 with counter-directed projections or beads 17 and 18 as intimated by broken lines in FIG. 1. These beads are dimensioned so that together they cover the greater portion of the height of the passage 4. In the unloaded state of the fastening device of the present invention, there may be a space between them, while this space can be closed when the anchorage portion is snapped in place in the carrier.

According to the present invention, it is also possible to make a through opening 19 in the wall 12 of the holder portion 2 facing away from the anchorage portion 1 as shown by the broken line in FIG. 1, in line with the passage 4, and to provide the defining walls of the passage 4 with longitudinal recesses or channels in their mutually facing surfaces, in such a design and construction, it would be possible to pass in, through the opening 19 in the wall 12, a locking pin or the like in the longitudinal recesses in the passage 4, so that thereby a positive forcing apart of both shanks 11 of the anchorage portion 1 away from one another will be achieved. Such an insertion of the locking pin is possible as soon as as the object in the accommodation space 3 does not cover the above-mentioned longitudinal recesses, which is possible because of the elongate design of the accommodation space 3.

Further modifications of the-present invention are conceivable without departing from the spirit and scope of the appended claims,

We claim:

1. A fastening member for fastening an object, such as a net, a steel wire, cable and the like to a carrier, comprising: one holder portion for fixedly retaining the object, one anchorage portion for anchoring the fastening member in an opening in the carrier, said anchorage portion having barb means and a longitudinally extending passage opening into an accommodation space provided in the holder portion, the wall of the holder portion facing away from the anchorage portion having an opening aligned with the passage for introducing a locking pin into the passage, and the anchorage portion is substantially rigid while the holder portion is resiliently yieldable for allowing deformations to occur when introducing the object into the accommodation space and when introducing the anchorage portion into the opening of the carrier.

2. A fastening member as claimed in claim 1, characterized in that walls defining the passage have longitudinally extending grooves on surfaces thereof facing one another.

3. A fastening member as claimed in claim 1, characterized in that the passage has a bell shaped end portion disposed away from said accommodation space.

4. A fastening member as claimed in claim 1, characterized in that upper and lower surfaces defining the passage have mutually facing projections at portions thereof located most proximal to the accommodation space.

5. A fastening member as claimed in claim 1, wherein said anchorage portion includes means for abutment against a front or outer side of the carrier, or a rear or inner side of the carrier, respectively, said abutment means including planar surfaces.

6. A fastening member as claimed in claim 1, wherein said anchorage portion includes means for abutment against a front or outer side of the carrier, or a rear or inner side of the carrier, respectively, said abutment means including substantially cylindrical surfaces.

7. A fastening member as claimed in claim 2, characterized in that the passage has a bell shaped end portion disposed away from said accommodation space.

8. A fastening member as claimed in claim 2, characterized in that upper and lower surfaces defining the passage have mutually facing projections at portions thereof located most proximal to the accommodation space.

9. A fastening member as claimed in claim 3, characterized in that upper and lower surfaces defining the passage have mutually facing projections at portions thereof located most proximal to the accommodation space.

10. A fastening member as claimed in claim 2, wherein said anchorage portion includes means for abutment against a front or outer side of the carrier, or a rear or inner side of the carrier, respectively, said abutment means including planar surfaces.

11. A fastening member as claimed in claim 3, wherein said anchorage portion includes means for abutment against a front or outer side of the carrier, or a rear or inner side of the carrier, respectively, said abutment means including planar surfaces.

12. A fastening member as claimed in claim 4, wherein said anchorage portion includes means for abutment against a front or outer side of the carrier, or a rear or inner side of the carrier, respectively, said abutment means including planar surfaces.

13. A fastening member as claimed in claim 2, wherein said anchorage portion includes means for abutment against a front or outer side of the carrier, or a rear or inner side of the carrier, respectively, said abutment means including substantially cylindrical surfaces.

14. A fastening member as claimed in claim 3, wherein said anchorage portion includes means for abutment against a front or outer side of the carrier, or a rear or inner side of the carrier, respectively, said abutment means including substantially cylindrical surfaces.

15. A fastening member as claimed in claim 3, wherein said anchorage portion includes means for abutment against a front or outer side of the carrier, or a rear or inner side of the carrier, respectively, said abutment means including substantially cylindrical surfaces.

16. A fastening member for fastening an object, such as a net, steel wire, cable and the like to a carrier, comprising; one holder portion for fixedly retaining the object, one anchorage portion for anchoring the fastening member in an opening in the carrier, said anchorage portion having barb means and a longitudinally extending passage opening into an accommodation space provided in the holder portion, the anchorage portion is substantially rigid while the holder portion is resiliently yieldable for allowing deformations to occur when introducing the object into the accommodation space and when introducing the anchorage portion into the opening of the carrier, the holder portion is substantially C-shaped in cross section such that a vertical dimension of the accommodation space is significantly larger than a horizontal dimension of the accommodation space extending in a direction of an axis of the longitudinally extending passage, and said holder portion is sufficiently resiliently yieldable to permit said longitudinally extending passage to be resiliently flared to at least twice a normal height thereof.

17. A fastening member as claimed in claim 16, characterized in that a horizontal dimension of the accommodation space extending perpendicular to the axis of the longitudinally extending passage is approximately the same as the vertical dimension of the accommodation space.

18. A fastening member for fastening an object, such as a net, a steel wire, cable and the like to a carrier, comprising;

one holder portion for fixedly retaining the object, one anchorage portion for anchoring the fastening member in an opening in the carrier, said anchorage portion having barb means and a longitudinally extending passage opening into an accommodation space provided in the holder portion, the anchorage portion is substantially rigid while the holder portion is resiliently yieldable for allowing deformations to occur when introducing the object in the accommodation space and when introducing the anchorage portion into the opening of the carrier, the holder portion is substantially C-shaped in cross section such that a vertical dimension of the accommodation space is significantly larger than a horizontal dimension of the accommodation space extending in a direction of an axis of the longitudinally extending passage, and a normal vertical dimension of said longitudinally extending passage is less than half of the vertical dimension of the accommodation space provided in the holder portion.

19. A fastening member for fastening an object, such as a net, a steel wire, cable and the like to a carrier, comprising;

one holder portion for fixedly retaining the object, one anchorage portion for anchoring the fastening member in an opening in the carrier, said anchorage portion having barb means and a longitudinally extending passage opening into an accommodation space provided in the holder portion, the anchorage portion is substantially rigid while the holder portion is resiliently yieldable for allowing deformations to occur when introducing the object in the accommodation space and when introducing the anchorage portion into the opening of the carrier, the holder portion is substantially C-shaped in cross section such that a vertical dimension of the accommodation space is significantly larger than a horizontal dimension of the accommodation space extending in a direction of an axis of the longitudinally extending passage, and a normal vertical dimension of said longitudinally extending passage is less than half of the vertical dimension of the accommodation space provided in the holder portion, said anchorage portion having two legs, said legs being provided adjacent to one another and one on either side of the longitudinally extending passage, and said legs further being arranged for being jointly introduced into one said opening in the carrier.

* * * * *

UNITED STATES PATENT AND TRADEMARK OFFICE
CERTIFICATE OF CORRECTION

PATENT NO. : 5,547,322
DATED : 20 August 1996
INVENTOR(S) : Lars Lilja, Ulf Enroth Page 1 of 2

It is certified that error appears in the above-indentified patent and that said Letters Patent is hereby corrected as shown below:

On the title page, under "Foreign Application Priority Data", change the Swedish priority application no. from "9200949" to --9200949-7--;

under "References Cited", correct the spelling of "Petrl" to --Petri--.

Column 1, line 32, change "prior an" to --prior art--;
line numbered between 42 and 43, before "cable" insert a comma;
line 60, change "prior an" to --prior art--.

Column 2, line 12, change "detective" to --defective--;
line numbered between 34 and 35, change "portion I" to --portion 1--;
line 63, change "portion I" to --portion 1--;
line 66, change "lacing" to --facing--.

Column 3, line 66, after the comma insert --i.e.--;
line 67, before the period insert --the extent between the walls 12, 14 as shown--.

Column 4, line 27, change "22" to --two--;
line numbered between 34 and 35, change "tile" to --the--;
line numbered between 50 and 51, change "pans" to --parts--.

UNITED STATES PATENT AND TRADEMARK OFFICE
CERTIFICATE OF CORRECTION

PATENT NO. : 5,547,322
DATED : 20 August 1996
INVENTOR(S) : Lars Lilja, Ulf Enroth It is certified that error appears in the above-indentified patent and that said Letters Patent is hereby corrected as shown below:

Column 5, line numbered between 25 and 26, between "1" and "as" insert a left parenthesis;

line numbered between 26 and 27, between "1" and the comma insert a right parenthesis;

line numbered between 29 and 30, change "surfaces, in" to --surfaces. In--;

line numbered approximately 40, between "the" and "present" delete the hyphen;

line numbered approximately 42, change "claims," to --claims.--.

Signed and Sealed this

Eleventh Day of March, 1997

Attest:

BRUCE LEHMAN

*Attesting Officer*  *Commissioner of Patents and Trademarks*